United States Patent
Przybylski et al.

(10) Patent No.: US 7,548,983 B2
(45) Date of Patent: Jun. 16, 2009

(54) CONFIGURABLE CONNECTOR ADAPTED TO CONVEY DATA BETWEEN A FIRST APPLICATION AND A SECOND APPLICATION

(75) Inventors: Piotr Przybylski, San Carlos, CA (US); Michael Beisiegel, Poughkeepsie, NY (US); Jean-Sebastien Delfino, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 10/488,636

(22) PCT Filed: Jul. 1, 2002

(86) PCT No.: PCT/GB02/03050

§ 371 (c)(1),
(2), (4) Date: Mar. 4, 2004

(87) PCT Pub. No.: WO03/024055

PCT Pub. Date: Mar. 20, 2003

(65) Prior Publication Data

US 2004/0267933 A1 Dec. 30, 2004

(30) Foreign Application Priority Data

Sep. 10, 2001 (CA) .................... 2357165

(51) Int. Cl.
*G06F 15/16* (2006.01)
(52) U.S. Cl. .............. 709/230; 709/246; 709/249; 370/466
(58) Field of Classification Search ............ 709/224, 709/228, 230, 246, 203, 249; 370/466, 467; 710/105
See application file for complete search history.

(56) References Cited

U.S. PATENT DOCUMENTS 5,257,393 A * 10/1993 Miller .................. 709/224

(Continued)

FOREIGN PATENT DOCUMENTS

WO WO0056033 9/2000

OTHER PUBLICATIONS

Shu, et al., "Challenges of Information Technology Management in the 21$^{st}$ Century", 2000, Information Resources Management Association International Conference, pp. 590-593.

(Continued)

*Primary Examiner*—Saleh Najjar
*Assistant Examiner*—Marie Georges Henry
(74) *Attorney, Agent, or Firm*—Yee & Associates, P.C.; David A. Mims, Jr.

(57) ABSTRACT

Embodiments of the present invention provide a connector adapted to convey data between a first application and a second application (or application components). The applications may be hosted by different computer systems interconnected by a communications link or network. The connector in addition to being interposed between the first and second application is adapted to communicate with one or more protocol handlers (wherein a protocol handler provides the formatting of data to conform with a specific protocol—e.g., HTTP, SOAP, etc.). The protocol handlers configure the connector thus allowing data received by the connector from the first application to be serviced (e.g., formatted) to conform to the protocol provided by the protocol handler which has been "plugged" into the connector.

7 Claims, 5 Drawing Sheets

U.S. PATENT DOCUMENTS

| | | |
|---|---|---|
| 6,083,276 A | 7/2000 | Davidson et al. |
| 6,625,168 B1 * | 9/2003 | Langer et al. ............... 370/466 |
| 6,675,054 B1 * | 1/2004 | Ruberg ........................ 700/94 |
| 6,782,403 B1 * | 8/2004 | Kino et al. .................. 707/203 |
| 6,993,585 B1 * | 1/2006 | Starkovich et al. .......... 709/228 |
| 7,080,387 B2 * | 7/2006 | Blaukopf et al. ............ 719/328 |
| 7,111,077 B1 * | 9/2006 | Starkovich et al. .......... 709/246 |

OTHER PUBLICATIONS

Proceedings of the 7$^{th}$ USENIX TCL/TK Conference:, 2000, pp. 105-115.

* cited by examiner

US 7,548,983 B2

1

CONFIGURABLE CONNECTOR ADAPTED TO CONVEY DATA BETWEEN A FIRST APPLICATION AND A SECOND APPLICATION

FIELD OF THE INVENTION

This invention relates generally to the field of computer communications. More particularly, the invention relates to a configurable connector for facilitating data exchange.

BACKGROUND OF THE INVENTION

In recent years, there has been a dramatic increase in the use of computer networks for sharing information. Although local area networks (LANs) and the Internet have existed for some time, a few simple protocols for data exchange sufficed in these generally homogenous networks. The very rapid increase in the use of the World Wide Web has resulted in the interconnection of large numbers of computer systems. Over time many protocols for data exchange have been developed.

Typically these protocols define a mechanism for packaging data to be transmitted from one computer system to another. A typical protocol defines an envelope or header that is assembled when data is to be transmitted. The envelope may define quality of service information and other information about the transmitting computer system and/or the data. The envelope and data are then assembled into a message and transmitted to the receiving computer system.

Every software component, or client, that transmits data according to the protocol must format the data in accordance with the protocol by generating the envelope in the required format and combining it with the data in a required manner. Typically, this is done by using a protocol handler that assembles the envelope and manages the transmission and reception of envelope and data.

When the protocol is modified, for example, by changing the format of the envelope or by adding or replacing parts of the protocol, the protocol handler must typically be modified. In many cases, the software component using the protocol must also be modified. Such modifications can be time-consuming and costly. For a large company that uses many different software components, each of which must be modified to accommodate changes in a communication protocol, the cost of modifying or purchasing updates for each component can be substantial. When the components use a variety of different protocols, the cost can become overwhelming.

It is preferable to connect computer systems with a connector that allows a data transmission protocol to be modified without requiring modification of the software that uses the protocol. Preferably, the connector is configurable so that it can handle and process data of any format.

DISCLOSURE OF THE INVENTION

Embodiments of the present invention provide a connector adapted to convey data between a first application and a second application (or application components). The applications may be hosted by different computer systems interconnected by a communications link or network.

The connector in addition to being interposed between the first and second application is adapted to communicate with one or more protocol handlers (wherein a protocol handler provides the formatting of data to conform with a specific protocol—e.g., HTTP, SOAP, etc.). The protocol handlers configure the connector thus allowing data received by the connector from the first application to be serviced (e.g., for-

2 matted) to conform to the protocol provided by the protocol handler which has been "plugged" into the connector.

In an exemplary embodiment, a connector, embodying aspects of the invention, is adapted to receive and transmit data from the first application in the form of objects. These objects include two functions (or methods): a "read" method, which is adapted to read information stored within the object (e.g., get property values); and a "write" information (e.g., set properties) to the object.

In an exemplary operation, a connector, embodying aspects of the invention, receives, from the first application, an object containing data for transmittal ("payload data") to the second application using the communications link. The connector which has been configured to provide a protocol service (through the "plugging" in of a protocol handler) receives the object. This received object is then passed by the connector to the protocol handler. The protocol handler processes the data contained therein (through use of the "read" and "write" methods) in accordance with the protocol supported by the handler and generates a packet or envelope containing the payload data. The packet is then passed to the connector. The connector then passes the packet to the communications link for transmission.

The connector also performs the same operations (in reverse) for objects received through the communications link. That is, a packet received by the connector from the second application (and transmitted over the communications link), is transferred to the protocol handler which extracts the payload data and, using the "write" method, populates an object which is then passed to the connector. The connector then passes this populated object to the first application.

As will be appreciated, embodiments of the invention provide a static interface to the first application. As a result, if the protocol being employed for communication between the first and second application is modified or replaced with a different protocol, the first application need not be modified. Rather, the connector is reconfigured by unplugging the protocol handler supporting the previously employed protocol and a new protocol handler (supporting the newly employed protocol) is plugged into the connector.

In one aspect, the present invention provides a connector for facilitating data transfer between a first and second application, said connector providing data conversion service for communications between said first and second applications, said connector comprising: a receiver adapted to: receive data from said first application; and receive formatted data from a protocol handler, said protocol handler supporting a communications protocol; a transmitter adapted to: transmit formatted data received from said protocol handler to said second application; and transmit data received from said first application to said protocol handler, said protocol handler converting said received data into formatted data; and wherein said data conversion service provided by said connector is determined by said communications protocol supported by said protocol handler.

In a further aspect, the present invention provides a connector for facilitating data transfer between a first and second application, said connector comprising: a first interface adapted to communicate with said first application; a second interface adapted to communicate with a protocol handler; a third interface adapted to communicate with said second application; and a processing core in communication with said first, second and third interfaces, said processing core adapted to: transmit data to and receive data from said first application through said first interface; forward data received from said first application to said protocol handler through said second interface; forward formatted data received from said protocol handler through said second interface to said second application through said third interface; forward data received from said protocol handler through said second interface to said first application through said first interface; and forward formatted data received from said second application through said third interface to said protocol handler through said second interface.

In a further aspect, the present invention provides a connector interposed between a first and second application, said connector comprising: a first interface for communication with said first application; a second interface for communication with said second application; a configuration interface adapted to removably receive a selected protocol handler from a plurality of protocol handlers; wherein said connector provides data conversion services for communication between said first and second applications, said data conversion services determined by said selected protocol handler received by said configuration interface.

In a further aspect, the present invention provides a connector for providing a plurality of different data conversion services for facilitating communication between a first application and a second application, said connector communicating with said first application using a first data format and said connector communicating with said second application using a second data format, said connector comprising: a first means for transferring data conforming to said first data format between said connector and said first application; a second means for transferring data conforming to said second data format between said connector and said second application; configuration interface means for removably receiving a first protocol handler, said protocol handler converting between said first data format and said second data format; and wherein, if said second data format is modified, said first protocol handler is replaced with a second protocol handler, said second protocol handler converting between said first data format and said modified second data format.

In a further aspect the present invention provides a method of sending data from a component operating in an infrastructure to a target system across a communication line, comprising: (a) configuring an outgoing protocol handler to convert outgoing data into an outgoing message; (b) establishing a connection between said infrastructure and said communication line; (c) receiving an output record containing said outgoing data from said component; and (d) transmitting said outgoing data on said communication line.

In a further aspect, the present invention provides a method of receiving incoming data transmitted over a communication link by a target system to a component comprising: (a) configuring an incoming protocol handler to extract said incoming data from an incoming message; (b) receiving said incoming message from said communication line; (c) extracting said incoming data from said incoming message by invoking said incoming protocol handler; and (d) providing said incoming data to said component.

In a further aspect, the present invention provides a computer readable medium contain instructions for implementing a method of sending data from a component operating in an infrastructure to a target system across a communication line, comprising:

(a) configuring an outgoing protocol handler to convert outgoing data into an outgoing message;

(b) establishing a connection between said infrastructure and said communication line;

(c) receiving an output record containing said outgoing data from said component;

(d) transmitting said outgoing data on said communication line.

In a further aspect, the present invention provides a computer readable medium containing instructions for implanting a method of receiving incoming data transmitted over a communication link by a target system to a component comprising:

(a) configuring an incoming protocol handler to extract said incoming data from an incoming message;

(b) receiving said incoming message from said communication line;

(c) extracting said incoming data from said incoming message by invoking said incoming protocol handler; and (d) providing said incoming data to said component.

In a further aspect, the present invention provides a method for facilitating data transfer between a first and second application, said method providing data conversion service for communications between said first and second applications, said method comprising: receiving data from said first application and formatted data from a protocol handler, said protocol handler supporting a communications protocol; transmitting formatted data received from said protocol handler to said second application; and wherein said data conversion service provided is determined by said communications protocol supported by said protocol handler.

In a further aspect, the present invention provides a method for facilitating data transfer between a first and second application, said method comprising: transmitting data to and receive data from said first application through a first interface; forwarding data received from said first application to said protocol handler through a second interface; forwarding formatted data received from said protocol handler through said second interface to said second application through a third interface; forwarding data received from said protocol handler through said second interface to said first application through said first interface; and forwarding formatted data received from said second application through said third interface to said protocol handler through said second interface.

In a further aspect, the present invention provides a method for facilitating communication between a first and second application, said method comprising: presenting a first interface for communication with said first application; presenting a second interface for communication with said second application; presenting a configuration interface adapted to removably receive a selected protocol handler from a plurality of protocol handlers, wherein said connector provides data conversion services for communication between said first and second applications, said data conversion services determined by said selected protocol handler received by said configuration interface; passing first data received from said first application destined for said second application to a removably received protocol handler for data conversion; passing converted first data received from a removably received protocol handler to said second application; passing second data received from said second application to said protocol handler for conversion; and passing converted second data to said first application.

In a further aspect, the present invention provides a computer readable media storing data and instructions, said data and instructions for adapting a computer system to facilitate data transfer between a first and second application, said computer system providing data conversion service for communications between said first and second applications, said data and instructions adapting said computer system to: receive data from said first application and formatted data from a protocol handler, said protocol handler supporting a communications protocol; transmit formatted data received from said protocol handler to said second application; and wherein said data conversion service provided is determined by said communications protocol supported by said protocol handler.

In a further aspect, the present invention provides a computer readable media storing data and instructions, said data and instructions for adapting a computer system to facilitate data transfer between a first and second application, said data and instructions adapting said computer system to: transmit data to and receive data from said first application through a first interface; forward data received from said first application to said protocol handler through a second interface; forward formatted data received from said protocol handler through said second interface to said second application through a third interface; forward data received from said protocol handler through said second interface to said first application through said first interface; and forward formatted data received from said second application through said third interface to said protocol handler through said second interface.

In a further aspect, the present invention provides a computer readable media storing data and instructions, said data and instructions for adapting a computer system to facilitate communication between a first and second application, said data and instructions adapting said computer system to: present a first interface for communication with said first application; present a second interface for communication with said second application; present a configuration interface adapted to removably receive a selected protocol handler from a plurality of protocol handlers, wherein said connector provides data conversion services for communication between said first and second applications, said data conversion services determined by said selected protocol handler received by said configuration interface; pass first data received from said first application destined for said second application to a removably received protocol handler for data conversion; passing converted first data received from a removably received protocol handler to said second application; pass second data received from said second application to said protocol handler for conversion; and pass converted second data to said first application.

In another aspect, the present invention provides: a J2EE compliant connector comprising the classes:

(a) B2BConnection;
(b) B2BConnectionFactory;
(c) B2BConnectionMetaData;
(d) B2BConnectionRequestInfo;
(e) B2BConnectionSpec;
(f) B2BInteraction;
(g) B2BInteractionSpec;
(h) B2BManagedConnectionFactory;
(i) B2BManagedConnection;
(j) B2BManagedConnectionMetaData;
(k) B2BPayloadBufferRecord;
(l) B2BPayloadMappingRecord;
(m) B2BProtocolRecord;
(n) B2BResourceAdapterMetaData;
(o) B2BQOS;
(p) Protocol2ServiceMessageMapping; and
(q) ServiceMessage2ProtocolMapping.

Other aspects of the invention includes any of the above aspects and embodiments provided on a computer readable medium. Other features and aspects of the invention are described in the following detailed description of a preferred embodiment of the invention.

BRIEF DESCRIPTION OF THE DRAWINGS

The present invention will now be explained by way of example only with reference to the drawings, in which.

DETAILED DESCRIPTION OF THE INVENTION

Figure 1:
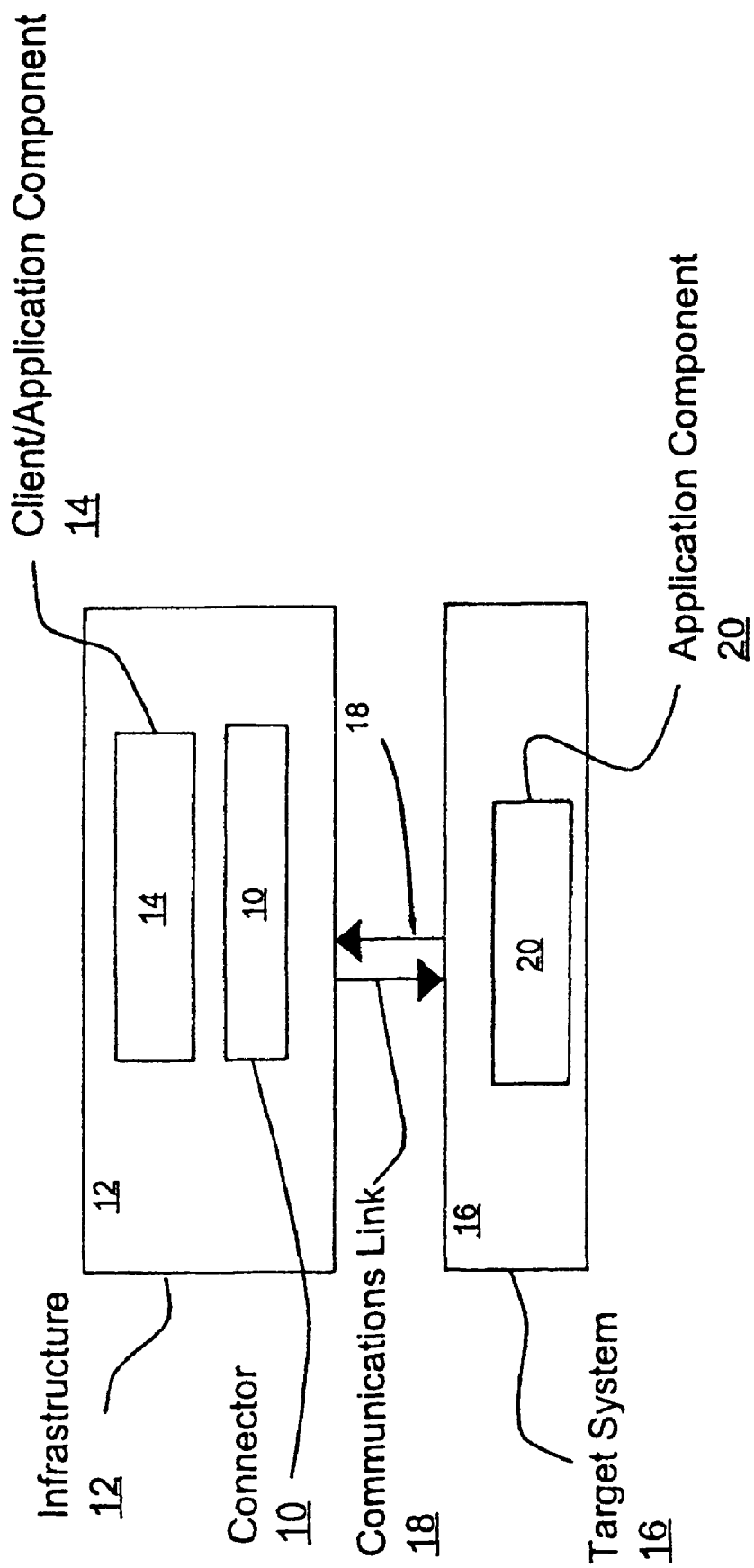
FIG. 1 is a block diagram of a connector according to the present invention and a system for using the connector.

In overview, the exemplary embodiment described herein provides a connector adapted to convey data between a first (client) application and a second (target) application (or application components). The applications are hosted by different computer systems interconnected by a communications link or network. However, as will be appreciated, the first and second applications could be, in alternative embodiments, hosted by the same computer system.

The connector in addition to being interposed between the first and second application is adapted to communicate with one or more protocol handlers (wherein a protocol handler provides the formatting of data to conform with a specific protocol—e.g., HTTP, SOAP, etc.). The protocol handlers configure the connector thus allowing data received by the connector from the first application to be serviced (e.g., formatted) to conform to the protocol provided by the protocol handler which has been "plugged" into the connector.

In the exemplary embodiment, a connector, embodying aspects of the invention, is adapted to receive and transmit data from the first application in the form of objects. These objects include two functions (or methods): a "read" method, which is adapted to read information stored within the object (e.g., get property values); and a "write" information (e.g., set properties) to the object.

In an exemplary operation, a connector, embodying aspects of the invention, receives, from the first application, an object containing data for transmittal ("payload data") to the second application using the communications link. The connector which has been configured to provide a protocol service (through the "plugging" in of a protocol handler) receives the object. This received object is then passed by the connector to the protocol handler. The protocol handler processes the data contained therein (through use of the "read" and "write" methods) in accordance with the protocol supported by the handler and generates a packet or envelope containing the payload data. The packet is then passed to the connector. The connector then passes the packet to the communications link for transmission to the second (target) application.

The connector also performs the same operations (in reverse) for data received through the communications link. That is, a packet received by the connector from the second application (and transmitted over the communications link), is transferred to the protocol handler which extracts the payload data and, using the "write" method, populates an object which is then passed to the connector. The connector then passes this populated object to the first application. In the exemplary embodiment, the object populated by the protocol handler may be provided to the connector by the first application or, alternatively, the connector may create an object (a generic object) which is populated.

As will be appreciated, embodiments of the invention provide a static interface to the first application. As a result, if the protocol being employed for communication between the first and second application is modified or replaced with a different protocol, the first application need not be modified. Rather, the connector is reconfigured by unplugging the protocol handler supporting the previously employed protocol and a new protocol handler (supporting the newly employed protocol) is plugged into the connector.

As will be further appreciated, if a protocol changes, the application component is "unaware" of the change in the protocol handler and the machinations performed thereby (since the application component communicates only with the connector). Other advantages of the present invention will be appreciated by those of ordinary skill in the art upon reading the entirety of the specification.

Reference is first made to FIG. 1, which illustrates a connector 10 according to the present invention. Connector 10 operates within an infrastructure 12, which will typically be a computer system. Infrastructure 12 may be referred to as a platform, and may include an operating system and other software and hardware. An application component 14 (or client) is also operative within infrastructure 12. In this exemplary embodiment, component 14 is configured to use XML to format outgoing data that is sent, using a bi-directional communication link 18, to a target computer system 16 for use by an application component 20 operating within target system 16. Application component 20 returns incoming data, also formatted using XML, using communications link 18. In another embodiment, the incoming and outgoing data may be formatted using any other format or method.

Connector 10 allows component 14 to transmit outgoing data and receive incoming data using communication link 18. Communication link 18 may be a fixed link established between infrastructure 12 and target system 16. Alternatively, communication link 18 may be a transient or persistent link established over a network such as the Internet, a LAN or a WAN using a transport protocol, for example HTTP or MQSeries, made available through the J2EE Connector Architecture interfaces.

Connector 10 accesses communication link 18 through infrastructure 12, using its security and other services. Communication link 18 operates using a selected transport protocol. In this exemplary embodiment, communication link 18 operates using the HTTP protocol as its transport protocol and Simple Object Access Protocol (SOAP) as the data format. The SOAP protocol is described on the Internet at www.w3.org/TR/SOAP, version 1.1, the contents of which are hereby incorporated herein by reference. The SOAP protocol, like most other protocols, specifies an envelope that is added to data to form a message that is transmitted via communication link 18.

The present exemplary embodiment of the invention is consistent with the Java 2, Enterprise Edition Connector Architecture, Proposed Final Draft 2 document, which is available on the Internet at http://java.sun.com/j2ee/download.html#connectorspec (the "J2EE Connector Architecture Specification", version 1.0, proposed final draft 2, released Apr. 4, 2001), the contents of which are hereby incorporated herein by reference.

Exemplary connector 10 is intended to allow "Business-to-Business" (B2B) computer connections. However, this usage is merely exemplary and connector 10 is equally suitable for connecting any types of computer systems or infrastructures to one another. The use of "B2B" is only exemplary and the names of the classes and methods of connector 10, which are described below, may be varied within the scope of the invention.

Connector 10 includes the following classes:
1. B2BConnection
2. B2BConnectionFactory
3. B2BConnectionMetaData
4. B2BConnectionRequestInfo
5. B2BConnectionSpec
6. B2BInteraction
7. B2BInteractionSpec
8. B2BManagedConnectionFactory
9. B2BManagedConnection
10. B2BManagedConnectionMetaData
11. B2BPayloadBufferRecord
12. B2BPayloadMappingRecord
13. B2BProtocolRecord
14. B2BResourceAdapterMetaData
15. B2BQOS
16. Protocol2ServiceMessageMapping
17. ServiceMessage2ProtocolMapping The functionality of each of these classes and interfaces is discussed below.

1. B2BConnection Class

The B2BConnection class includes the following methods:
B2BConnection(ManagedConnection)
void call(InteractionSpec, Record, Record)
void close( )
Interaction createinteraction( )
boolean getAutoCommit( )
LocalTransaction getLocalTransaction( )
B2BManagedConnection getManaged( )
ConnectionMetaData getMetaData( )
ResultSetInfo getResultSetInfo( )
void logTrace(String)
void setAutoCommit(boolean)
void setLogWriter(PrintWriter)
void setManaged(B2BManagedConnection)

The B2BConnection class represents an application handle of component 14 to the communication link 18. A B2Bconnection object is created by the B2BConnectionFactory class and is associated with a particular B2BManagedConnection instance through which data is transmitted on communication link 18. The B2BConnection object creates B2BInteraction objects, using its createinteraction( ) method implementation.

The B2BConnection object throws a javax.resource.NotSupportedException from the following methods: setAutoCommit(boolean), getLocalTransaction( ), getAutoCommit( ) and getResultSetInfo( ).

The close request (in the close( ) method implementation) passes the close request to the associated B2BManagedConnection instance.

This class handles interaction requests from the B2BInteraction objects it creates, in the call( ) method, which is implemented in addition to the required interface methods by passing the execution request along with its instance to the associated B2BManagedConnection instance.

2. B2BconnectionFactory

The B2BConnectionFactory class includes the following methods:
B2BConnectionFactory( )
B2BConnectionFactory(ConnectionManager)
Connection getconnection( )
Connection getConnection(ConnectionSpec)
Connection getConnection(Map)
ManagedConnectionFactory getManagedConnectionFactory( )
ResourceAdapterMetaData getMetaData( )

RecordFactory getRecordFactory( )
Reference getReference( )
Service getservice( )
void logTrace(String)
void setConnectionManager(ConnectionManager)
void setManagedConnectionFactory(ManagedConnectionFactory)
void setReference(Reference)

The B2BConnectionFactory class represents objects capable of creating active connections using communication link 18. It is instantiated by and maintains an association with an instance of the B2BManagedConnectionFactory. It also contains an instance of the ConnectionManager class which it uses to obtain connections during the connection request, in the getConnection( ) method implementations.

3. B2BConnectionMetaData

The B2BConnectionMetaData class includes the following methods:
B2BConnectionMetaData(B2BConnection)
String getEISProductName( )
String getEISProductversion( )
String getUserName( )

The B2BconnectionMetaData class is an object used to store connection information. It contains accessor methods to retrieve the following information:
    EISProductName
    EISProductVersion
    UserName 4. B2BConnectionRequestInfo The B2BConnectionRequestInfo class includes the following methods:
boolean equals(Object)
String getPassword( )
String getUserName( )
int hashcode( )
void setPassword(String)
void setUserName(String)

The B2BConnectionRequestInfo class contains the connection specific information that does not change the characteristics of a B2BManagedconnection object. In this exemplary embodiment, a B2BconnectionRequestInfo object contains a user name and password. The user name and password represent credentials of the component 14, and are used to authenticate the component 14.

5. B2BConnectionSpec

The B2BConnectionSpec class includes the following methods:
boolean equals(Object)
String getPassword( )
String getUserName( )
int hashcode( )
void setPassword(String)
void setUserName(String)

The B2BconnectionSpec class represents application level access to the connection specific information corresponding to the information contained in an associated B2BconnectionRequestInfo object.

6. B2Binteraction

The B2BInteraction class includes the following methods:
B2BInteraction(Connection)
void clearwarnings( )
void close( )
Record execute(InteractionSpec, Record)
boolean execute(InteractionSpec, Record, Record)
Connection getconnection( )
RecordFactory getRecordFactory( )
ResourceWarning getwarnings( )
void logTrace(String)
void setLogWriter(PrintWriter)

The B2BInteraction class represents objects used by component 14 to perform communications with target system 16 through the connector 10 over communications link 18. The B2BInteraction object is created by the B2BConnection class, which maintains a reference to this object. The execution request from either of the B2Binteraction class's execute( ) methods is passed to the associated B2BConnection instance for processing (by invoking the call( ) method).

If the execute method with only an input record is invoked (Record execute(InteractionSpec, Record)), the B2BInteraction creates a new instance of the B2BPayloadBufferRecord and passes it to the call method as the output record.

Since the B2BInteraction does not maintain any state, the implementation of the close method does not perform any operation except verifying that it is not already closed. If it is, i.e. the close method had been previously invoked, the method throws javax.resource.spi. IllegalStateException. This exception is also thrown if one of the execute( ) methods is invoked when the B2BInteraction has been closed.

7. B2BInteractionSpec

The B2BInteractionSpec class includes the following methods:
int getInteractionVerb( )
InteractionSpec getTransportInteractionSpec( )
void setInteractionVerb(int)
void setTransportInteractionSpec(InteractionSpec)

The B2BInteractionSpec interface extends the InteractionSpec interface of the J2EE Connector Architecture. The B2BInteractionSpec is used to configure the behavior of connector 10 with respect to the communication link 18 being used. The implementation of B2BInteractionSpec is provided by the provider of the Servicemessage2ProtocoMapping and Protocol2ServiceMessageMapping protocol handlers. B2BInteractionSpec contains methods to set and retrieve the InteractionVerb of the B2BInteractionSpec that determines the type of the interaction to be performed (send, receive or send_receive) and the type transport InteractionSpec. The latter determines properties of the interaction performed using the selected tra nsport protocol.

The B2BInteractionSpec provides an interface between connector 10 and application 14. Additionally, B2BInteractionSpec provides an interface with communication link 18 (and, thus, application component 20 of target computer system 16). Additionally, B2BInteractionSpec provides an interface for configuring connector 10 to provide the data conversion process (i.e., processing or converting data received from application component 14 into a format for transmittal to application component 20 on communications link 18). As such, in this latter feature, B2BInteractionSpec provides a configuration interface so that connector 10 can be engaged or interfaced with a protocol handler 24. The protocol handler 24 being removably engaged or interfaced with connector 10.

B2BInteractionSpec provides a portion of the processing core (e.g., the receiving and transmittal of the various forms data from application component 14, application component 20 and protocol handler 24) of connector 10.

This processing core, for which B2BInteractionSpec forms a part, acts as a receiver of data from application 14 (which conforms to one data format—an object in the exemplary embodiment) and data which has been converted from a packet or envelope. Additionally, the processing core acts as transmitter for data which requires transmission to applications 14 and 20. Accordingly, connector 10, in part, acts as a transceiver.

As will be appreciated, connector 10 provides three interfaces to three elements: application 14, application 20 and protocol handler 24. However, much of these three interfaces are provided by B2BInteractionSpec.

8. B2BManagedConnectionFactory

The B2BManagedConnectionFactory class includes the following methods:
B2BManagedConnection(Subject, ConnectionRequestInfo)
void addConnectionEventListener(ConnectionEventListener)
void associateConnection(Object)
void call(B2BConnection, InteractionSpec, Record, Record)
void cleanups
void close(B2BConnection)
void destroy( )
void errorOccurred(Exception)
Object getConnection(Subject, ConnectionRequestInfo)
LocalTransaction getLocalTransaction( )
PrintWriter getLogWriter( )
ManagedConnectionMetaData getMetaData( )
Subject getSecurityContext( )
String getUserName( )
XAResource getXAResource( )
boolean isDirty( )
void logTrace(String)
void removeConnectionEventListener(ConnectionEventListener)
void setDirty(boolean)
void setLogWriter(Printwriter)
void setManagedConnectionFactory(B2BManagedConnectionFactory)

The B2BManagedConnectionFactory creates physical connections over communications link 18. This is done by using the createManagedConnection( ) method to create instances of the B2BManagedConnection that use communication link 18 to perform actual communication with target system 16.

The B2BManagedConnectionFactory allows the behavior of connector 10 to be configured by providing accessors for the following properties:

Protocol2ServiceMessagemapping—this property contains an instance of a custom protocol handler capable of processing inbound messages received by the connector 10 from communication link 18 and interpreting the envelope in the message. The Protocol2ServerMessageMapping property extracts data from an incoming message and forwards it to component 14.

ServiceMessage2ProtocolMapping—this property contains an instance of a custom protocol handler capable of receiving output data from component 14 and producing an envelope consistent with the protocol used by communications link 18 to produce a message suitable for transmission.

TransportSpc—this property is an instance of the B2BManagedConnectionTransportSpec object that defines the transport protocol to be used by connector 10.

Alternatively, the transport protocol may be the protocol used by communication link 18, or it may be a protocol understood by any other connector that complies with the J2EE Connector Architecture. This allows connector 10 to be stacked, with another connector. In this case, the TransportSpec property contains an instance of the transport protocol's ConnectionFactory, which is used to create connections, and an instance of the transport protocol's InteractionSpec, which characterizes interactions performed by connector 10 using this specific transport protocol.

If connector 10 is not stacked with another connector, then the TransportSpec property is undefined. In this case, connector 10 must perform communications on communication link 18 using communication link specific interfaces set out in the implementation of the B2BManagedConnection's call( ) method.

TransportSpecName—the name of the transport protocol to be used. If the transportspec property is not defined, but the TransportSpecName property is specified, the B2BManagedConnectionFactory will attempt to retrieve the TransportSpec object from the JNDI context by looking up the TransportSpecName, in the createTransportSpec( ) method implementation.

HttpTransportURL—if the transport protocol is the HTTP protocol, the URL address of system 16 may be specified directly using this property, without providing transport specification in any other way (i.e. without using the TransportSpec and TransportSpecName properties). The HTTP protocol is a default transport for connector 10.

The B2BManagedConnectionFactory class also implements methods required by the J2EE Connector Architecture specification, such as:

(i) createConnectionFactory(..) that creates B2BConnectionFactory objects,
(ii) equalso that compares instances of the B2BManagecConnectionFactory,
(iii) get/setLogwriter( ) to specify the logging facility,
(iv) hashcode( ) calculating the hash value of the factory instance, and
(v) matchManagedConnections( ), a method that selects from a candidate set he B2BManagedConnection instance's best matching component's request.

9. B2BManagedConnection

The B2BManagedConnection class includes the following methods:
Object createConnectionFactory( )
Object createConnectionFactory(ConnectionManager)
ManagedConnection createManagedConnection(Subject, ConnectionRequestInfo)
void createTransportSpec( )
boolean equals(Object)
String getHttpTransportURL( )
PrintWriter getLogwriter( )
Protocol2ServiceMessageMapping getProtocol2ServiceMessageMapping( )
Servicemessage2ProtocoMapping getServicemessage2ProtocoMapping( )
B2BManagedConnectionTransportSpec getTransportSpec( )
String getTransportSpecName( )
int hashCode( )
void logTrace(String)

The B2BManagedConnection class represents a physical connection on communication link 18 to target system 16. B2BManagedConnection instantiates B2BConnections, which component 14 uses to access the physical connection.

The B2BManagedConnection supports multiple handles, however only the most recently created handle can be used to perform interactions. An attempt to the access the physical connection from any other handle, before the last handle created is closed, is treated as an error and causes the an IllegalStateException to be thrown.

Validation and current handle maintenance is implemented by storing handles in the stack data structure with the valid (and most recently created) handle at the top. Each access to the physical connection from the B2BConnection is validated against this data structure and the appropriate action is taken.

B2BManagedConnection class implements support for the construction of the generic envelope enclosing outgoing data being sent by connector 10 by allowing the configured outbound protocol handler Servicemessage2ProtocoMapping to add the protocol specific envelope to produce an outgoing message.

The call( ) method, implemented in addition to methods defined on the interface, of B2BManagedConnection is a protected method that invokes the Servicemessage2ProtocoMapping and Protocol2ServiceMessageMapping protocol handlers. The call( ) method passes the current handle, InteractionSpec, input and output records to the protocol handler.

The B2B ManagedConnection class also implements the following methods that are used to manage connections:
(i) void associateconnection(Object)—in this method, the passed B2BConnection object is disassociated from its current B2BManagedConnection, by invoking its close method and then associated with this managed connection. After execution, the passed B2BConnection is the current handle to the B2BManagedConnection;
(ii) void cleanup( ) this method empties the connection handles stack;
(iii) void close(B2BConnection)—in this method the B2BManagedConnection removes the handle that invoked the method from the top of the stack and fires CONNECTION_CLOSED event;
(iv) void destroy( )—this method cleans up the internal state of the B2BManagedConnection by emptying and deallocating handles stack; and
(v) Object getConnection(Subject, ConnectionRequestInfo)—in this method, a new connection handle is created, put on the top of the handles stack and returned.

10. B2BManagedConnectionMetaData

The B2BManagedConnectionMetaData class includes the following methods:
B2BManagedConnectionMetaData
 (B2BManagedConnection)
String getEISProductName( )
String getEISProductVersion( )
int getMaxConnections( )
String getUserName( )
B2BPayloadBufferRecord
Object clone( )
String getRecordName( )
String getRecordShortDescription( )
void read(InputStream)
void setRecordName(String)
void setRecordShortDescription(String)
void write(OutputStream)

The B2BManagedConnectionMetaData class provides information about connector 10 such as target system 16 product and version, max number of connections supported by the target system 16 and the user name of the component 14.

11. 1B2BPayloadBufferRecord

The B2BPayloadBufferRecord implements methods defined by the J2EE Connector Architecture specification interfaces it implements (Record and Streamable). These methods are:
clone( )
equals (Object)
getRecordName( )
getRecordShortDescription( )
hashCode( )
setRecordName(String)
setRecordShortDescription(String)
read(InputStream)
write(OutputStream)

The B2BPayloadBufferRecord class implements payload record, javax.resource.cci.Record and javax.resource.cci.Streamable interfaces from the J2EE Connector Architecture specification and therefore can be used as an argument to the execute( ) method of the Interaction. Connector 10 uses B2BPayloadBufferRecord as the output record in the implementation of the execute( ) method of the B2BInteraction with input only argument.

12. B2BPayloadMappingRecord

The B2BPayloadMappingRecord class includes the following methods:
Object clone( )
String getRecordName( )
String getRecordShortDescription( )
void read(InputStream)
void setRecordName(String)
void setRecordShortDescription(String)
void setX2XMLMapping(X2XMLMapping)
void setXML2XMapping(XML2XMapping)
void write(OutputStream)

The B2BPayloadMappingRecord implements a record whose contents can be written out or read into using mapping. This implementation can be used to map the contents of an arbitrary record to XML.

13. B2BProtocolRecord

The B2BProtocolRecord class includes the following methods:
Object clone( )
String getRecordName( )
String getRecordShortDescription( )
void read(InputStream)
void setB2BInteractionSpec(B2BInteractionSpec)
void setB2BQOS(B2BQOS)
void setProtocol2ServiceMessageMapping
 (Protocol2ServiceMessageMapping)
void setProtocol2ServiceResponseMapping
 (Protocol2ServiceMessageMapping)
void setRecord(Record)
void setRecordName(String)
void setRecordShortDescription(String)
void setServicemessage2ProtocoMapping
 (Servicemessage2ProtocoMapping)
void write(OutputStream)

The role and operation of the B2BProtocolRecord class is described in the description of transaction 100, described below.

14. B2BresourceAdapterMetaData

The B2BResourceAdapterMetaData class includes the following methods:
String getAdapterName( )
String getAdapterShortDescription( )
String getAdapterVendorName( )
String getAdapterVersion( )
String getInteractionSpecsSupported( )
String getSpecVersion( )
boolean supportsExecuteWithInputAndoutputRecord( )

boolean supportsExecuteWithInputRecordOnly( )
boolean supportsLocalTransactionDemarcation( )

The B2BResourceAdapterMetaData class provides component 14 with the characteristics of the connector 10 such as name, description, vendor name, adapter version and specification version supported. It also contains information describing which optional features of the J2EE Connector Architecture have been implemented, such as names of InteractionSpec implementation classes, which type of execute( ) methods connector 10 supports and whether connector 10 supports local transactions.

15. B2BQOS

This class is provided to allow the implementor of the connector to pass various quality of service (QOS) information. The QOS can include, transactional information, authentication information and authorization information. The implementation of this method depends on the capabilities of the infrastructure 12 and therefore the invention does not define any methods of the class. These methods will be defined by the implementor of the class for the specific infrastructure 12.

16. Protocol2ServiceMessageMapping

The Protocol2ServiceMessageMapping class includes the following methods:
void execute( )
void setB2BInteractionSpec(B2BInteractionSpec)
void setB2BQOS(B2BQOS)
void setInputStream(InputStream)
void setRecord(Record)

The Protocol2ServicemessageMapping class is a protocol handler used by connector 10 to convert an incoming message received on communication link 18 into incoming data for use by component 14. The Protocol2ServiceMessageMapping is implemented by a provider of connector 10 or another entity in accordance with the selected transport protocol or data protocol. When a change is made in the transport protocol or data protocol, the Protocol2ServiceMessageMapping implementation is correspondingly modified, allowing connector 10 and component 14 to utilize the modified transport protocol or data protocol without modification.

17. Servicemessage2ProtocoMapping

The Servicemessage2ProtocoMapping includes the following methods:
void execute( )
void setB2BInteractionSpec(B2BInteractionSpec)
void setB2BQOS(B2BQOS)
void setOutputStream(OutputStream)
void setRecord(Record)

The Servicemessage2ProtocoMapping class is the complement to the Protocol2ServiceMessageMapping class for outgoing messages. It is similarly implemented and kept up to date by the provider of connector 10 so that it is consistent with the current version of the selected transport protocol or data protocol.

Figure 2:
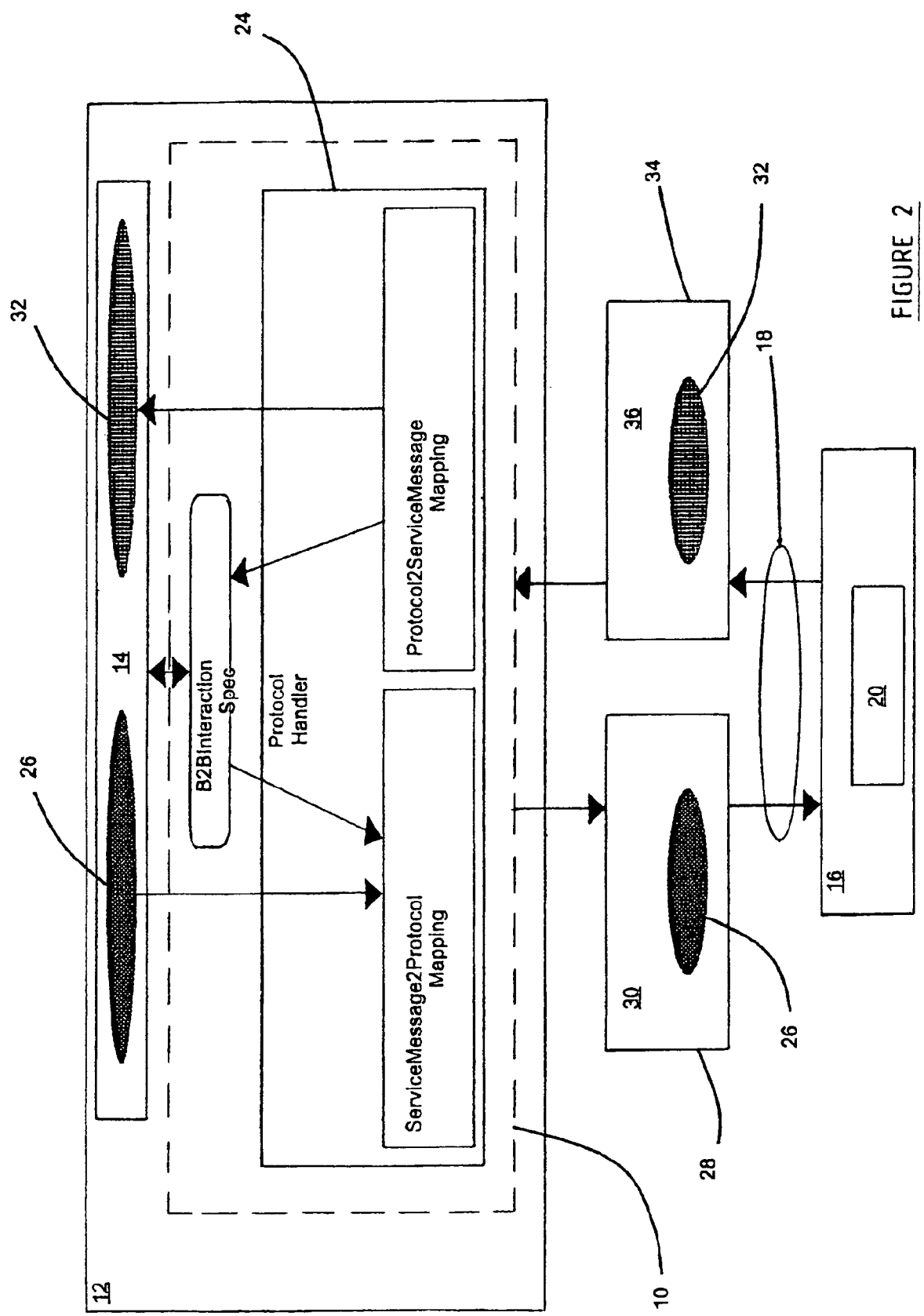
FIG. 2 is a more detailed block diagram of the connector of FIG. 1.

Reference is next made to FIG. 2. Collectively, the Protocol2ServiceMessageMapping and Servicemessage2ProtocoMapping mapping classes provide a protocol handler 24 that allows component 14 to (i) transmit outgoing data 26 on communications channel as part of an outgoing message 28 that includes the outgoing data 26 and an envelope 30 and (ii) receive incoming data 32 which is extracted from an incoming message 34 that includes an envelope 36.

B2BInteractionSpec class, which is used to configure connector 10 according to the communication link 18, is coupled between protocol handler 24 and component 14 to allow the type of interaction (send, receive or send and receive) to be set.

Figure 3:
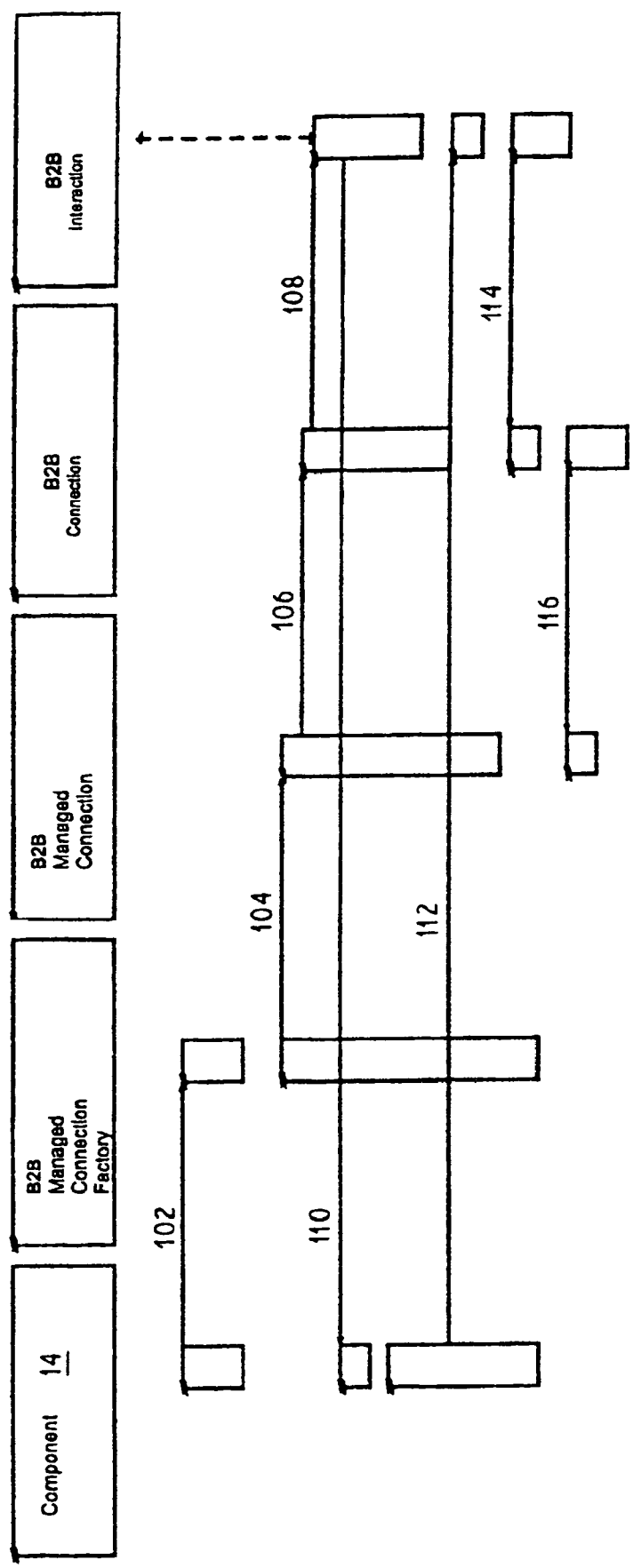
FIGS. 3, 4 and 5 are communication and data flow diagrams illustrating the operation of the connector of FIG. 1.
Figure 4:
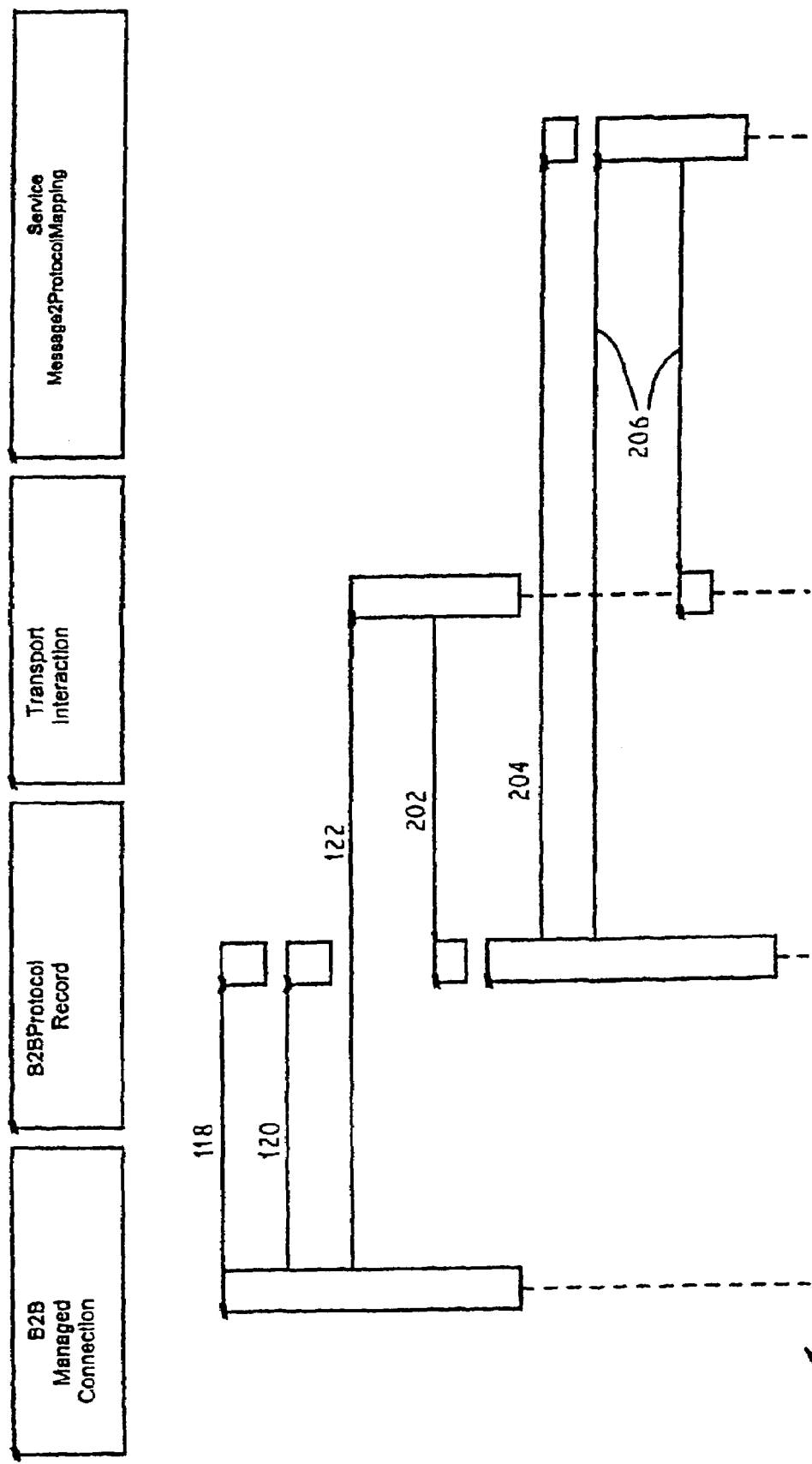
Figure 5:
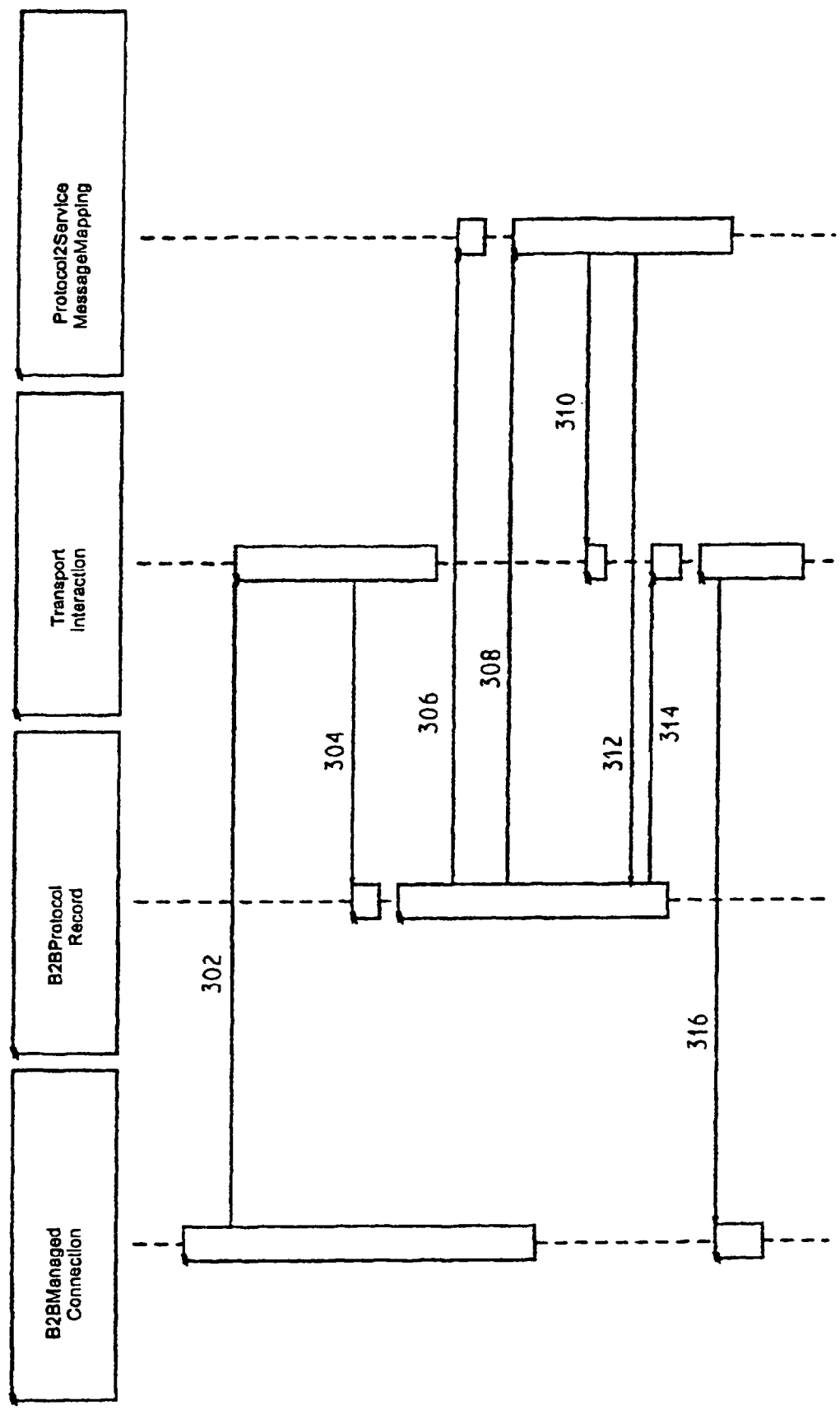

The operation of connector 10 will now be described with reference to FIGS. 3, 4 and 5 which illustrate the communication and data flow during an exemplary transaction 100 between component 14 and target system 16. Transaction 100 may be a send transaction or a receive transaction, or a combination send and receive transaction. Steps 102 to 122 of transaction 100 are common to both the send and receive transactions. After step 122, transaction 100 divides into branches 200 and 300. Branch 200 is performed if a send transaction is specified. Branch 300 is performed if a receive transaction is specified. Branches 200 and 300 may be performed sequentially or they may be performed concurrently. Send and receive transactions are specified by setting the InteractionVerb property of the B2BInteractionSpec class.

The exemplary transaction 100 begins in step 102, in which component 14 creates an instance of the B2BManagedConnection Factory and sets its Protocol2ServiceMessageMapping, Servicemessage2ProtocoMapping and TransportSpec properties.

The settings of the Protocol2ServiceMessageMapping and Servicemessage2ProtocoMapping properties will depend on the data transport protocol. In the present exemplary embodiment, the Protocol2ServiceMessageMapping and Servicemessage2ProtocoMapping properties contain a custom handler that handles incoming and outgoing messages, respectively, using the SOAP protocol.

The TransportSpec property defines the transport protocol of the connector intended for use as the transport connector. In the present example, connector 10 is stacked with a J2EE compliant HTTP transport connector, which allows communication over communication link 18.

During step 102, component 14 uses the createConnectionFactory( ) method of the B2BManagedConnectionFactory class to create an instance of a B2BConnectionFactory. Component 14 then calls the getconnection( ) method of the B2BConnectionFactory, causing infrastructure 12 to request a new connection from the B2BManagedConnectionFactory.

Transaction 100 next proceeds to step 104, in which the B2BManagedConnectionFactory creates a new instance of the B2BManagedConnection and sets its properties. One of the properties that is set is the B2BManagedConnectionFactory itself, which in turn gives the B2BManagedConnection access to the Protocol2ServiceMessageMapping and Servicemessage2ProtocoMapping protocol handlers.

Transaction 100 next proceeds to step 106, the B2BManagedConnection created in step 104 creates an instance of a B2BConnection. A connection handle to the B2BManagedConnection, an instance of B2BConnection is returned to component 14.

Transaction 100 next proceeds to step 108. In this step, component 14 requests a B2BInteraction by calling the createinteraction( ) method of the B2BConnection instance. During the call to its createinteraction( ) method, B2BConnection creates a new instance of a B2BInteraction object. The B2BManagedConnectionFactory's TransportSpec object is retrieved and used to get the ConnectionFactory of the transport protocol. The TransportSpec object is in turn used to create a Connection object. From the Connection object, the B2BManagedConnection creates an instance of a B2BInteraction object.

Transaction 100 next proceeds to step 110, in which the new B2BInteraction object is returned to component 14.

Transaction 100 next proceeds to step 112, in which component 14 invokes the execute( ) method of the new B2BInteraction object. Component 14 passes a B2BInteractionSpec interface and input and output records to the B2BInteraction object.

The B2BInteractionSpec is an interface to the SOAPInteractionSpec object of the SOAP protocol that implements, in the current exemplary embodiment, the B2BInteractionSpec interface. In another embodiment, the B2BInteractionSpec interface will be an interface consistent with the Protocol2ServiceMessageMapping and Servicemessage2ProtocoMapping protocol handlers specified for the B2BManagedConnectionFactory in step 102.

The input and output records implement the javax.resource.cci.Record and javax.resource.cci.Streamable interfaces and input record contains XML data to be sent to target system 16.

Transaction 100 next proceeds to step 114, in which the B2BInteraction object invokes the call( ) method of the B2BConnection and passes the component request to it.

Transaction 100 next proceeds to step 116, B2BConnect invokes the call( ) method of the B2BManagedConnection and passes the request from component 14 and a reference to itself to the B2BManagedConnection.

Transaction 100 next proceeds to step 118, in which B2BManagedConnection executes the call( ) method invoked in step 116. In this step, if the InteractionVerb property of InteractionSpec object is receive or send_receive, B2BManagedConnection creates a new instance of the B2BprotocolRecord and then sets its properties as follows:
i. Protocol2ServiceMessageMapping, as set by component 14 in step 102 and received from B2BManagedConnectionFactory;
ii. B2BInteractionSpec, which was passed by component 14 to the execute( ) method of the B2BInteraction object in step 112;
iii. the input record, passed by the component to the execute( ) method of the B2BInteraction object in step 112; and
iv. a B2BQOS object that contains quality of service information relating to infrastructure 12.

This B2BProtocolRecord object is the new incoming B2BProtocolRecord record.

Transaction 100 next proceeds to step 120. If the InteractionVerb property of InteractionSpec object is send or send_receive, B2BManagedConnection creates a new instance of a B2BProtocolRecord object and sets its properties as follows:
i. Servicemessage2ProtocoMapping—taken from the B2BManagedConnectionFactory instance, as set by component 14 in step 102;
ii. B2BInteractionSpec, which was passed by component 14 to the execute method( ) of the B2BInteraction object in step 112;
iii. output record, which was also passed by passed by component 14 to the execute method( ) of the B2BInteraction object in step 112; and
iv. a B2BQOS object that contains quality of service information relating to infrastructure 12.

This B2BProtocolRecord object is the new outgoing B2BProtocolRecord record.

Transaction 100 next proceeds to step 122, in which the B2BManagedConnection object invokes the execute( ) method of the transport connector's Interaction object. This Interaction was created in step 102 by setting the transportspec property of the B2BManagedConnection Factory to identify the transport connector, which in this exemplary embodiment is an HTTP transport connector. In the present example, both an input B2BProtocolRecord object and an ouputB2BProtocolRecord object have been instantiated by B2BManagedConnection.

Transaction 100 then has two branches 200 and 300, which may be executed separately or in sequence, send then receive.

If the InteractionVerb property of InteractionSpec object is send or send_receive, then branch 200 will be performed.

Branch 200 begins in step 202, during which transport invokes a write( ) method of the input B2BProtocolRecord object.

Branch 200 next proceeds to step 204, in which the write( ) method invoked in step 124 is processed. The input B2BProtocolRecord object set the following properties of the Servicemessage2ProtocoMapping protocol handler:

B2BInteractionSpec, Record, B2BQOS (all of which were set in step 118) and the output stream (i.e. the port on which communication link 18 is connected to infrastructure 12). The output stream is subsequently passed as an argument to the write( ) method by the transport connector.

Branch 200 next proceeds to step 206, in which the execute( ) method of the Servicemessage2ProtocoMapping transport handler is invoked. The Servicemessage2ProtocoMapping transport handler writes to the envelope and the data, taken from the data record passed in step 112. When the data is written, the execute( ) returns allowing the return from the write( ) method of the B2BProtocolRecord, which was defined in step 124.

Branch 200 Then Ends.

Neither the B2BProtocolRecord nor the B2B Connector have any knowledge of the contents of the envelope or the outgoing message written by the Servicemessage2ProtocoMapping transport handler to the output stream. Because of this transparency, the Servicemessage2ProtocoMapping transport handler can change the data it writes out without the need of altering connector 10 or component 14 in any way.

Branch 300 illustrates the receive operation of connector 10. Branch 300 begins in step 302, which is performed after step 122, if a receive operation has been configured by instantiating an input B2BProtocolRecord object.

In step 302, the transport connector invokes the read( ) method of the input B2BProtocolRecord object and passes the input stream to the read method. The input stream contains both an envelope and input data from the target system 16.

Branch 300 next proceeds to step 304, in which the input B2BProtocolRecord objects sets the following properties of the Protocol2ServiceMessagemapping object (in a manner analogous to step 120): data output record, B2BQOS, B2BInteractionSpec and the input stream passed to the read( ) method.

Branch 300 next proceeds to step 306, in which the input B2BProtocolRecord object invokes the execute( ) method of the Protocol2ServiceMessageMapping object. The Protocol2ServiceMessageMapping object reads the envelope and input data from the input stream passed by the transport connector. The Protocol2ServiceMessageMapping object strips the envelope and puts the input data only into the output record.

Branch 300 next proceeds to step 308, in which the execute( ) method of the Protocol2ServiceMessageMapping returns. At this point, the output record of the input B2BProtocolRecord object (which was set in step 120) contains the data, without envelope, transmitted by the target system 16.

Branch 300 next proceeds to step 310, in which the reado method of the input B2BProtocolRecord object returns.

Branch 300 next proceeds to step 312, in the transport execute( ) method returns from the invocation started in step 122. At this point the B2BManagedConnection returns from its call( ) method, which was invoked in step 116. Then B2BConnection returns from its call( ) method, which was invoked in step 114. Then B2BInteraction returns from its call( ) method, which was invoked in step 112. The output record specified by component 14 in step 112 contains the input data returned from the target system.

Branch 300 therefore provides the incoming data to component 14 with the envelope removed from it, thereby eliminating any need to modify component 14 if the protocol used to defined the envelope (the SOAP protocol in the present embodiment) or the transport protocol (the HTTP protocol in the present embodiment) is modified or even completely replaced.

Connector 10 provides a transparent mechanism for a component 14 to communicate with a target system 16. The assembly and disassembly of outgoing and incoming message is made transparent. Any change to the envelope in the messages or in the transport protocol may be addressed by simply modifying the ServiceMesssage2ProtocolMapping and Protocol2ServiceMessageMapping protocol handlers.

The present invention has been described in a business-to-business ("B2B") context. The invention is suitable for any context in which a component requires access to a target system across a communication link. Furthermore, the use of specific names for the classes, methods, objects and interfaces of connector 10 and other elements is only exemplary and any appropriate names may be used. These and other variations of the described embodiment fall within the spirit and scope of the invention, which is limited only by the following claims.

As will be appreciated, alternatives to the embodiment described herein possible. For example, a single connector could removably connect to multiple applications, communication links and/or protocol handlers simultaneously. Additionally, while in the exemplary embodiment objects were passed between connector and application 14, alternative embodiments need not pass objects but could pass other data formats. Additionally, while the exemplary embodiment was described with object oriented constructs, other language types (e.g., structure languages, etc.) could equally be employed.

The invention claimed is:

1. A method of receiving and sending data transmitted over a communication link between a second application in a target system and a first application in a data processing system, the method comprising:

configuring a connector in said data processing system using a protocol handler that formats incoming and outgoing messages to conform to a network transmission protocol used for communications between said second application in said target system and said first application in said data processing system, wherein said protocol handler is one of a plurality of protocol handlers that are removably plugged into said connector in said data processing system that includes said first application, each of said plurality of protocol handlers supporting a different network transmission protocol;

determining whether said network transmission protocol used for communications between said second application in said target system and said first application in said data processing system was replaced with a different network transmission protocol;

responsive to determining that said network transmission protocol was replaced with a different network transmission protocol, reconfiguring said connector in said data processing system by unplugging from said connector said protocol handler that supported said network transmission protocol previously used and plugging into said connector a new protocol handler that supports said different network transmission protocol currently used;

receiving an incoming message from said second application in said target system transmitted over said communication link;

extracting payload data from said incoming message by invoking said new protocol handler, wherein said new protocol handler is configured to extract said data from said incoming message according to said different network transmission protocol by removing an envelope that was added to said payload data to form said incoming message, and wherein said envelope conforms to said different network transmission protocol;

providing said payload data to said first application in said data processing system; and sending an outgoing message from said first application in said data processing system to said second application in said target system transmitted over said communication link, wherein said new protocol handler removable plugged into said connector in said data processing system formats said outgoing message to conform to said different network transmission protocol currently used for communications between said first application in said data processing system and said second application in said target system.

2. A method for facilitating data transfer between a first application in a data processing system and a second application in a target system, said method providing data conversion service for communications between said first application and said second application, said method comprising:

configuring a connector in said data processing system using a protocol handler that formats incoming and outgoing messages to conform to a network transmission protocol used for communications between said first application in said data processing system and said second application in said target system, wherein said protocol handler is one of a plurality of protocol handlers that are removably plugged into said connector in said data processing system that includes said first application, each of said plurality of protocol handlers supporting a different network transmission protocol;

determining whether said network transmission protocol used for communications between said first application and said second application was replaced with a different network transmission protocol;

responsive to determining that said network transmission protocol was replaced with a different network transmission protocol, reconfiguring said connector in said data processing system by unplugging from said connector said protocol handler that supported said network transmission protocol previously used and plugging into said connector a new protocol handler that supports said different network transmission protocol currently used;

receiving, by said connector in said data processing system, data from said first application and formatted data from said new protocol handler;

transmitting said formatted data received from said new protocol handler to said second application based on said different network transmission protocol supported by said new protocol handler; and wherein said data conversion service provided is determined by said different network transmission protocol supported by said new protocol handler.

3. The method of claim 2, further comprising:
selecting a network transmission protocol, wherein an interface presented to said first application remains static irrespective of said selected network transmission protocol supported by at least one of said plurality of protocol handlers.

4. The method of claim 3, further comprising:
receiving formatted data from said second application and data from said new protocol handler; and
transmitting formatted data received from said second application to said new protocol handler and data received from said new protocol handler to said first application.

5. The method of claim 4, wherein said data comprises an object, and wherein said formatted data comprises a packet.

6. The method of claim 5, wherein:
a packet received from said new protocol handler is generated from payload data stored by an object received from said first application; and
an object transmitted to said first application is generated from payload data stored within a packet received from said second application.

7. The method of claim 6 wherein said object includes methods to read payload data from said object and write payload data to said object.

* * * * *